Oct. 15, 1957 P. H. WOODS ET AL 2,809,444
OMNI RANGE RESOLVER SIMULATOR FOR INSTRUMENT FLYING
AND LANDING AIRCRAFT GROUND TRAINERS
Filed Oct. 6, 1954 2 Sheets-Sheet 1
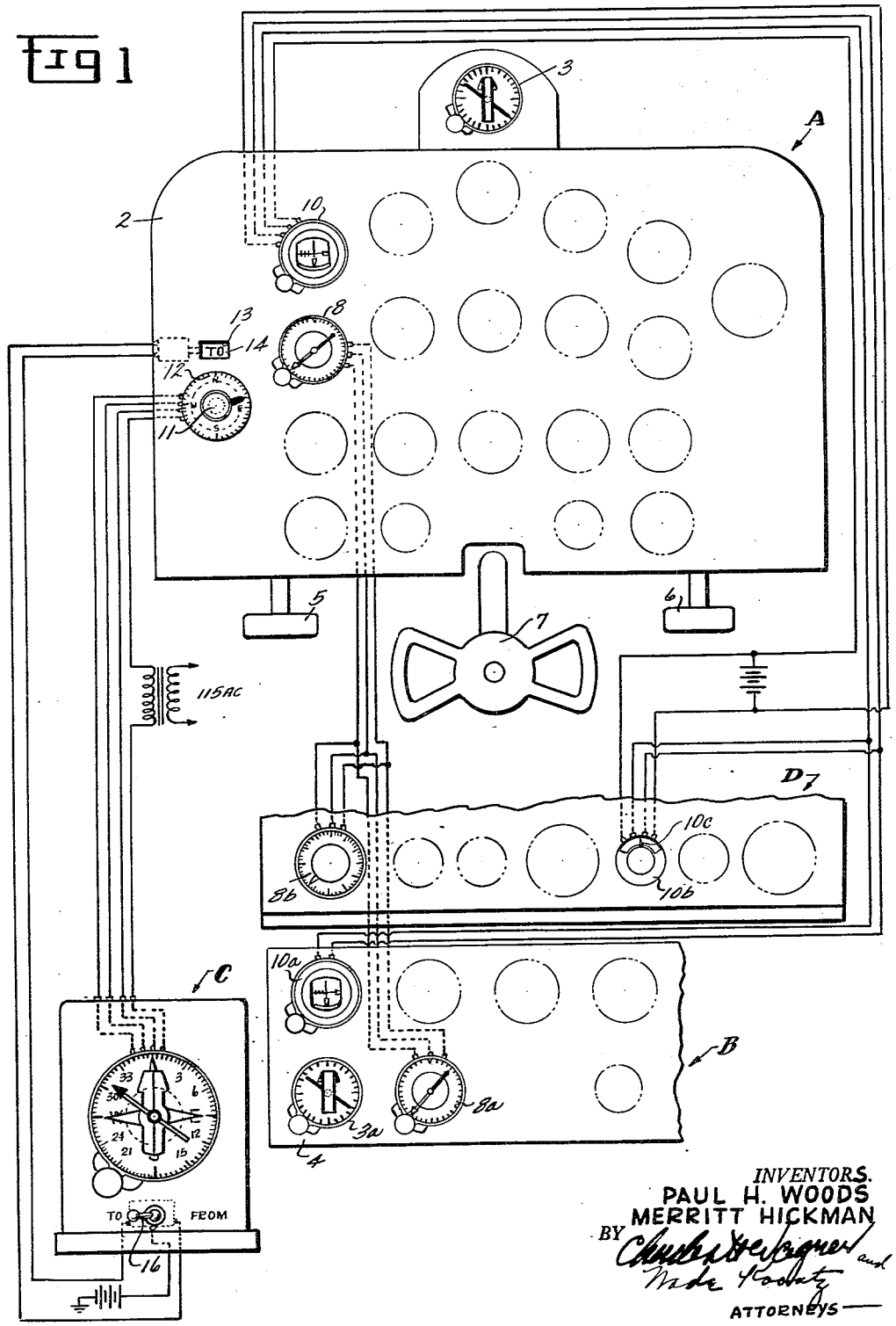
INVENTORS.
PAUL H. WOODS
MERRITT HICKMAN
BY
ATTORNEYS

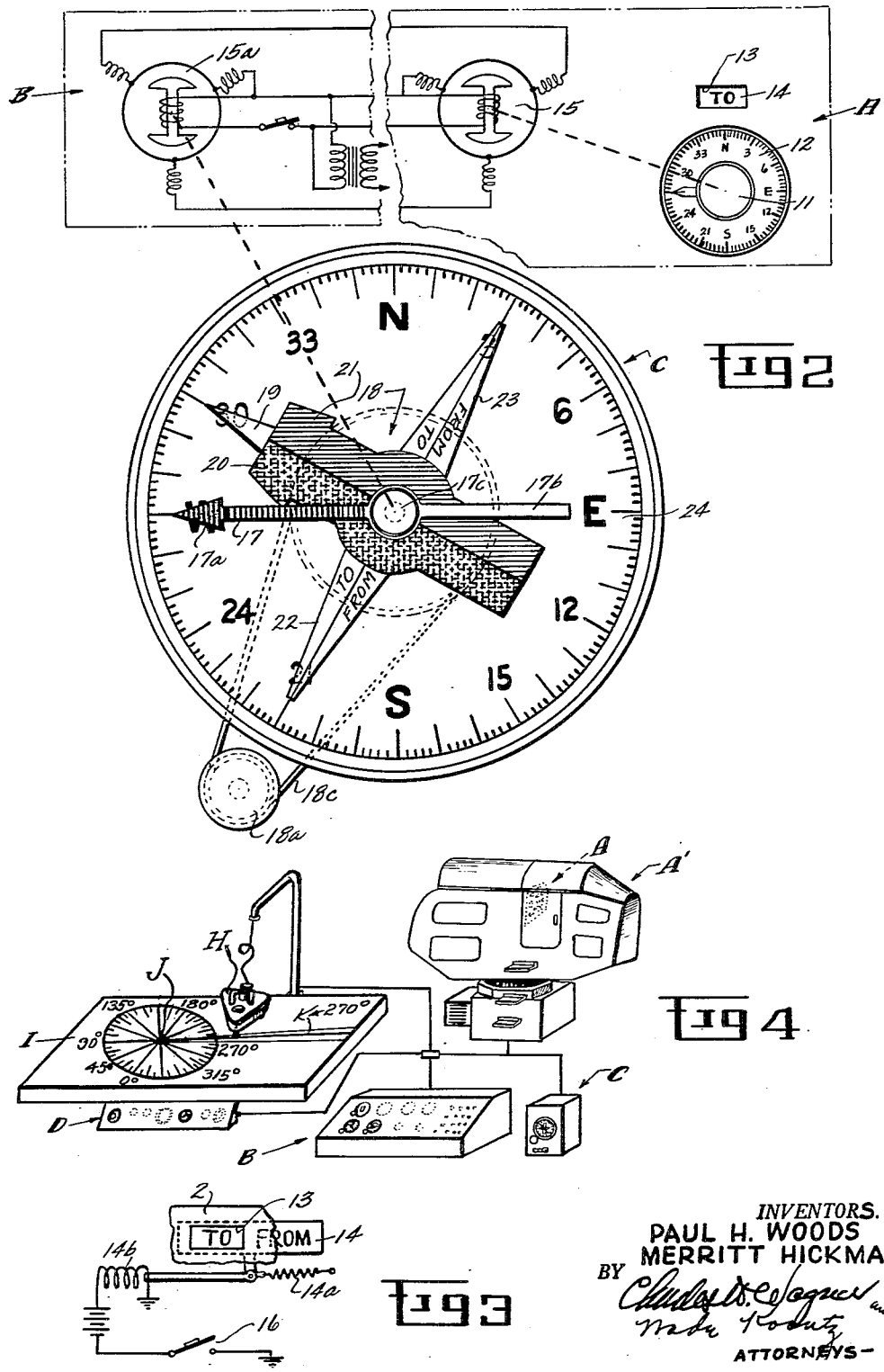

United States Patent Office 2,809,444
Patented Oct. 15, 1957

2,809,444

OMNI RANGE RESOLVER SIMULATOR FOR INSTRUMENT FLYING AND LANDING AIRCRAFT GROUND TRAINERS

Paul H. Woods, Independence, Iowa, and
Merritt Hickman, Eatonville, Wash.

Application October 6, 1954, Serial No. 460,781

5 Claims. (Cl. 35—10.2)

(Granted under Title 35, U. S. Code (1952), sec. 266)

The invention described herein may be manufactured and used by or for the United States Government for governmental purposes without payment to us of any royalty thereon.

This invention relates to aircraft instrument flying ground trainer devices of the "Link Trainer" types and more particularly to radio range training apparatus therein, having for an object the provision of means for exhibiting to the instructor exactly what "Yellow-Blue" and "To-From" signals the instructor should give to the operating pilot or trainee in the trainer at all times during "Omni" range flight training problems, this information not being heretofore directly available to the instructor in previous ground trainers so that the instructor could correspondingly adjust the conventional ILS and radio compass controls, and operate a simple "To-From" switch to effectively simulate and control the carrying out of any Omni range problem by the pilot or trainee in the flight trainer.

The Omni range resolver of the present invention combines Omni range bearing information from any simulated Omni range station selected by the adjustment of the pilot's Omni range selector, coordinated with the position and direction of travel of the simulated aircraft (recorder) relative to the simulated location of the Omni range station exhibiting simultaneously to the instructor the deviation from the two resulting values of the yellow-blue sectors of the Omni beam and the "To-From" direction of the simulated aircraft with respect to the simulated Omni range. Even though all inputs to the simulated flight training system are changing, or being changed continuously during the simulated flight the outputs will be clear and readable at all times to the instructor and to the pilot in the trainer.

The Omni range resolver is electrically controllably connected to a simulated Omni range selector in the simulated flight trainer aircraft which is adjustable by the trainee for the selection of any particular Omni range, a teletorque or selsyn being thereby adjusted which is connected to a teletorque in the Omni range resolver at the instructor's station to correspondingly adjust an Omni range indicating pointer to indicate the bearing of the range or beam selected by the pilot, the Omni range resolver also including a modified platform pointer manually adjustable by the instructor to indicate to him the simulated aircraft radio compass bearing, the indicator or platform pointer being mounted below the Omni range selection indicating pointer and divided longitudinally, and colored yellow and blue at opposite sides of the center line to represent the yellow-blue sectors of the beam with reference to the bearing direction of the radio station from the "bug" or recorder which simulates the position and direction of the simulated aircraft relative to the beam and station.

The resolver includes a "To-From" control switch at the instructor's station which is connected to a "To-From" annunciator or relay in the trainer or simulated aircraft which is directly associated with the pilot's simulated Omni range selector.

In carrying out a simulated Omni range problem certain conventional indicators and controls of a conventional aircraft radio compass instrument flying ground trainer of the Link type are employed as will hereafter be set forth briefly, other objects and advantages of the invention will become apparent from the following description and accompanying drawings in which like reference characters refer to like parts in the several figures of the drawings.

Drawings

Figure 1 is the somewhat schematic, diagrammatic plan or layout view of an instrument panel of an aircraft flight and landing ground trainer of the conventional Link type (known as type C–8), illustrating the pilot's simulated instruments and controls, also illustrated below is the instructor's conventional (remote) control station, incorporating the Omni range resolver simulator. However, only the instruments primarily involved in solving a simulated radio compass navigation Omni range problem are disclosed and the other instruments and controls in the pilot's and instructor's stations, for the sake of simplicity are omitted or left outlined in blank, or partly broken away.

Figure 2 is an enlarged front view in elevation of the Omni range resolver simulator schematically illustrating the electrical wiring between the resolver and to the trainee's station.

Figure 3 is an enlarged fragmentary detail view of the To-From Omni range direction annunciator and the instructor's control switch therefor with the wiring therebetween.

Figure 4 is a diagrammatic view of a ground trainer device of the Link type incorporating the Omni range resolver simulator.

Referring to Figure 1, the reference character A denotes the pilot's or trainee's station in the instrument flying ground trainer simulated aircraft, while B indicates the instructor's remote control station, having the Omni range resolver simulator indicated at C.

In the simulated aircraft trainer at the pilot's station A is the instrument panel 2 having a directional or remote indicating compass 3 connected conventionally to determine the simulated heading, teletorque connected to a similar directional compass or trainer heading indicator 3a on the instructor's remote instrument case 4. The steering or rudder controls are indicated at 5 and 6, while the "stick" or attitude control means is shown at 7, movement thereof in or out simulating "pitch" and rotation simulating "bank."

A pair of simulated radio compass indicators are provided the simulated aircraft radio compass indicator at 8 on the pilot's instrument panel 2, and the simulated instructor's radio compass indicator at 8-a on the instructor's panel 4, these being slaved together through teletorques for simultaneous adjustments by a teletorque connected radio compass bearing selector having an adjustment knob 8b mounted on the instructor's instrument radio control unit or panel D at the instructor's station B. Adjustment of the radio compass bearing selector knob 8b by the instructor will "set in" any radio compass bearing desired on the simulated radio compass devices 8 and 8a on the instrument panels 2 and 4. Since this indicates the direction of the simulated flight of the aircraft with respect to the position of the simulated radio station, and since this latter position is always changing as the simulated flight progresses, except when the flight is directly toward or away from the station, it is necessary for the instructor to determine the simulated aircraft's position which is determined from the position of the conventional dirigible "bug" or recorder device as it advances over the conventional map supporting surface representing or simulating the area being flown over with respect to the position of any simulated Omni range station or stations and Omni ranges located on the surface at all times.

Another simulated instrument which is incorporated in conventional ground trainers and may be used in the Omni range problem is the "localizer" having localizer pointer or indicator, localizer indicator and control therefor being provided at the instructor's control station. The two localizer instruments are indicated respectively at 10 on the instrument panel 2 at the pilot's station and 10a on the instructor's remote instrument case 4, these being controlled by adjustment of a localizer control knob 10b on the instructor's radio control unit D. Adjustment of the localizer control knob 10b to the left or right indicates to the trainee through the localizer indicator 10 the simulated position of the simulated aircraft in flight relative to the yellow or blue, A or N, segments of the radio range beam as the simulated aircraft approaches the Omni range beam, the center position of the control 10c indicating "on course," to or from the station as the case may be.

The localizers 10, 10a and the instructor's control 10b are conventional, the indicators, 10, 10a including localizer pointers or shiftable bars with magnetic fields at both sides for deflecting the localizer pointers to the right or left under control of a connected potentiometer which is operated by the localizer knob 10b for adjustment of the fields, and thus shifts the indicator bars of the localizers 10 and 10a left or right to indicate the simulated position in the yellow or blue sectors of the radio beam. The pilot's or trainer's instrument panel 2 is provided with an Omni range selector knob and pointer indicated at 11 and registering with a "compass rose" or circle of range angle indicating indicia 12 calibrated from 0 to 360 degrees. Also a small window openng 13 is provided above, for the selective display of a "To-Form" annunciator or relay device 14.

The adjustment of pointer 11 on indicia 12 by the trainee sets up the selected direction of any selected Omni range bearing during the simulated aircraft flight in the trainer by the trainee. Adjustment of the pointer 11 by the pilot adjusts a connected teletorque 15 to which is slaved a teletorque 15a in the Omni range resolver C at the instructor's station B. Also located at the instructor's station, preferably on or near the Omni range resolver C is an instructor's "To-From" indicator control switch 16 which is electrically connected to the "To-From" annunciator 14 on the pilot's simulated instrument panel 2, located above the Omni range selector 12.

Referring more particularly to Figures 2 and 3, a narrow Omni range selector pointer is indicated at 17 having an arrow or pointer end which is painted a distinctive color at 17a, such as red, the rear portion of the pointer 17–b at the other side of the teletorque axis being painted white.

A relatively wide pointer or radio compass indicator, hereafter referred to as a platform pointer, is indicated at 18 having a central pointer 19 projecting centrally from its front end and painted white, the body or top of the platform pointer being colored at opposite sides of its longitudinal center in two distinctive colors, 20 and 21, such as yellow and blue respectively to represent the A–N or yellow-blue segments of the Omni range. The platform pointer 18 is also provided with two long flat transverse pointers 22 and 23, projected from the opposite sides of the yellow-blue platform portion normal thereto at opposite sides of the platform pointer pivot shaft and painted white with a dividing line and the words "To" and "From" indicated thereon (see Fig. 2), indicating with the small white end pointer 19 the position and direction of the simulated aircraft relative to the Omni range selected and whether the simulated flight is toward or away from the selected Omni range. The white wing pointers 22 and 23 at the opposite sides of the platform pointer 18 provide the instructor with information hereinafter set forth. When the red pointer end 17a of the Omni beam direction pointer 17 is located between the two white side wings 22 and 23 in the semicircle of degree indicia 24 and the small white platform end pointer 19 on the platform pointer extends in the direction of the semi-circle which includes the red pointer end 17a, and the "To" hemisphere (between 22 and 23), the direction of simulated flight is immediately apparent as indicated to the instructor by the Omni range resolver as "To" and the switch 16 should be adjusted accordingly to cause the annunciator to register "To" through the window in pilot's instrument panel 2. When the red colored end 17a of the Omni range pointer 17 is shifted into the semicircle position of the compass rose which is the "From" hemisphere located between the ends of the white wings 22 and 23 which do not contain the white platform control pointer 19, then the simulated direction of the flight becomes immediately apparent to the instructor and should be changed by the instructor to "From" or indicating the departure from the Omni range and the control switch 16 should therefore be shifted accordingly to disclose the "From" signal in the window 13 in the pilot's instrument panel above the Omni range selector 12. An adjusting knob 18a is provided for manual adjustment of the platform pointer by the instructor, which may be geared to the platform pointer or connected for adjustment by a cable 18c as shown.

Any type of To-From switch 16 may be employed. Figure 3 illustrates one type somewhat diagrammatically wired with the "To-From" annunciator 14. The annunciator plate carrying the To-From indicia is normally held in the "To" position by a spring 14a, displaying to the trainee the indicia "To" through the window 13 when the switch 16 at the instructor's station is "open" and in the "To" position. Closing the switch 16 by moving the same to the "From" position energizes the circuit to the annunciator magnet 14b, shifting the annunciator plate 14 to display the "From" indicia through the window 13.

*Operation*

Assuming that a trainee is at the controls within the flight trainer A' at trainee's station A simulating a flight on instruments for solving an Omni range flight problem with the dirigible "bug" or recorder H on a map supporting surface I. Surface I should be a non-directional compass rose chart of 360 degrees, representing the position of the trainer aircraft relative to a point J on the surface I indicating an Omni range station and preferably the Omni range beam K selected from 0° through 359° therefrom with its yellow-blue or left-right sectors, the remote indicating compass 3 at the trainee's station A denoting the heading of the simulated aircraft. The instructor, noting the position of the recorder H relative to the Omni station J selected adjusts his radio compass control 8b adjust the pilot's radio compass 8 to the proper bearing directly toward the simulated radio station J. The trainee at A upon his selection of the Omni range from his range map adjusts his Omni range selector control knob 11 accordingly, which adjusts the Omni resolver pointer 17 to the bearing direction of the Omni range (not necessarily directly toward or away from the simulated station J unless the "bug" is in the center of the beam). The instructor upon noting the position of the recorder H relative to the Omni range station adjusts the control knob 18a so as to cause the central white pointer 19 of the platform pointer 18 to point in the direction between the recorder H and the range station J. This preferably should agree with the radio compass bearing indicated on the simulated radio compass instruments 8 and 8a, and therefore it is contemplated that the platform pointer 18 could be slaved with these instruments by conventional teletorque means if desired. The instructor then observes the position of the red end 17a of the Omni range indicating pointer 17 relative to the wing tips 22–23 and the white central pointer 19 of the platform pointer. If the red end 17a is located between the white central pointer 19 and either of the white wing tip pointers 22–23, the heading is toward the Omni range or in the "To" hemisphere and the instructor's control switch 16 if left "open," displays to the trainee pilot the annunciator indicia "To" in the window 13. Should, however, the platform pointer (or range selection be changed) so that the red pointer 17a is disposed in the semi-circle of the compass rose bearings on the Omni resolver extending between the wing pointers 22–23, which does not include the white pointer 19, and indicates in the "From" hemisphere, the instructor knows that the simulated flight is away from the Omni range and the switch 16 should be closed to shift the annunciator plate 14 and disclose the "From" signal to the trainee, indicating that he is departing away from the Omni range. This condition also occurs when the simulated flight passes over the Omni range station since the instructor will shift the platform pointer 18 to the reverse position and also reverse the position of the radio compass indicators 8 and 8a.

Assuming that the simulated flight is at an angle to the Omni range beam, the instructor by watching the travel of the recorder H relative to the Omni range station J adjusts the white central platform pointer 19 to agree with the simulated radio compass bearing toward the Omni range station. When the platform pointer yellow or blue area moves under the red pointer 17a the localizer control 10b can be correspondingly adjusted by the instructor to swing the indicator bar of the localizer 10 in the trainee's station (and in his instrument 10a) toward its center position. As the center of the simulated range beam is crossed the red pointer will be in its mid position over the platform pointer between the yellow-blue division immediately indicating to the instructor that the localizer should be adjusted to bring the localizer needle to center position, indicating to the trainee at A that he is now at or crossing the center of the range beam.

The simulated radio compass units are desirable but not required to simulate an Omni range flight since the pilot can find his bearing To or From the station by selecting or rotating the Omni bearing selector (Fig. 2) 11, until the localizer needle 10 centers. The compass rose (indicia) 12 under pointer or selector 11, and the To-From indicator gives the trainee the necessary information to fly the desired radial to or from the station.

It will be seen that there has herein been provided a novel and efficient Omni range resolver device for and in combination with instrument flying ground trainers, which is well adapted for the purposes indicated. Even though there has been shown and described the invention as containing certain features of construction and operation of parts, it is nevertheless understood that various changes may be made therein without departing from the spirit or scope of the invention as defined in the claims. Having thus described the invention, what is claimed as new and desired to be secured by Letters Patent is:

1. In an instrument flight ground trainer of the Link type, a supporting surface simulating an area to be flown over having an Omni range station simulated thereon, a dirigible flight recorder mounted on said surface for simulating flight thereover relative to said Omni range station, a trainee's station having simulated aircraft flight control means for controlling the simulated flight of the recorder, said trainee's station having an instrument panel; an instructor's station having a radio control panel, a simulated radio compass at said trainee's station, a second simulated radio compass at said instructor's station, radio compass indicating control means at the instructor's station teletorqued to the aforesaid simulated radio compasses for setting the heading thereof relative to said simulated Omni station, an Omni range selector at said trainee's station, an Omni range resolver at said instructor's station having an Omni range indicating pointer teletorqued to said Omni range selector for adjustment thereby to indicate the Omni range selected by the trainee, a platform pointer disposed concentrically to said Omni range indicating pointer said resolver having additional To-From indicating means thereon for cooperation with said Omni range indicating pointer for indicating the simulated direction of flight toward or away from said Omni range station and means for adjusting said platform pointer relative to said Omni range indicating pointer for determining the angular relation between the direction from the aircraft simulating recorder to the selected Omni station and the direction of movement of said recorder toward or away from said Omni range station and the direction of the Omni range.

2. Apparatus as claimed in claim 1 in combination with a simulated localizer at each of said instructor and trainee stations having a pointer for indicating the simulated relative ground track of the simulated aircraft within the Omni range beam at opposite sides of the center of the beam, and localizer control means at the instructor's station connected to each of said simulated localizers for simultaneous adjustment thereof by the instructor for shifting the localizer pointer to simultaneously indicate deviations of the simulated flight at opposite sides of the center of simulated Omni range beam.

3. Apparatus as claimed in claim 1 including a To-From indicating annunciator in said trainee's station adjacent said Omni range selector, a To-From annunciator actuating selector at said instructor's station connected to said To-From indicating annunciator at said trainee station for selective actuation thereof by the instructor to indicate to the trainee the simulated flight of the aircraft toward or away from the simulated Omni range station as indicated by the To-From annunciator means, as indicated by the relation of said Omni range indicating pointer to said platform pointer at said instructor's station.

4. An Omni range resolver for instrument flying and ground trainers of the Link type having a trainee's station including a simulated aircraft flight instrument panel, an instructor's station having supporting platform simulating an area to be flown over including a simulated Omni range beam radiating out from a simulated Omni range station depicted thereon, a dirigible flight recorder movable over said simulated area relative to said simulated Omni range station and beam under control of a trainee at said trainee's station simulating aircraft flight by the trainee over said area for solving an Omni range flight problem, said Omni range resolver comprising a compass rose, an Omni range indicating pointer rotatably mounted concentric to said compass rose, an Omni range selector on said trainee's instrument panel having corresponding compass rose, an Omni range selection pointer mounted concentrically of said corresponding compass rose for simulated Omni range selection adjustment by the trainee, teletorque adjustment means connected between both of said pointers for simultaneous adjustment movements thereof, a To-From annunciator mounted on said trainee's instrument panel adjacent said Omni range selector, a To-From Omni range selection actuator mounted at said instructor's station adjacent said Omni resolver actuating means connected between said To-From annunciator and said To-From Omni range selection actuator operable by the instructor to inform the trainee the simulated To or From directions of the simulated Omni range station relative to the simulated position of the ground trainer in flight as determined by the instructor from the position of the recorder, said Omni range resolver Omni range indicating pointer having its pointer end painted a distinctive color from its opposite end, a relatively wide platform pointer mounted concentrically intermediate its ends below said Omni range resolver Omni range indicating pointer for rotative adjustment independently of said Omni range indicating pointer and formed with transversely spaced pointer ends, said platform pointer being painted from end to end at one side of its longitudinal center line another distinctive color, representing the yellow segment of an Omni range beam, and painted end to end at the opposite side of its longitudinal center line another distinctive color representing the blue segment of an Omni range beam, a pointer projecting outwardly from the pointer end of the platform pointer on the longitudinal center line thereof painted another distinctive color indicating the direction of the simulated Omni range station at the center of the simulated Omni range beam, a pair of wing pointers projecting from the opposite sides of the platform pointer perpendicular to its longitudinal center line in a plane substantially through the coincident rotary adjustment axes of the platform and Omni range selector pointers, said wing pointers being painted a distinctive color similar to the central pointer color, and means for adjusting the platform pointer at said instructor's station according to the bearing of the recorder from the simulated Omni station, whereby the position of the Omni pointer end of the Omni range selection pointer with respect to the ends of the wing pointers and said central end pointer indicates to the instructor whether the direction of simulated flight of the simulated aircraft is To or From the selected simulated Omni station.

5. An Omni range resolver for an instructor's station in an aircraft instrument flying ground trainer of the Link type having a trainee's station, a supporting surface representing an area to be flown thereover having a simulated Omni range beam and station depicted thereon, a dirigible flight direction recorder movable thereon under remote control by the trainee in the trainee's station simulating Omni range flight of an aircraft over said simulated Omni range area, said Omni range resolver comprising a support at the instructor's station, a teletorque carried by said support, an Omni range selector indicating pointer operable thereby to indicate trainee selected Omni range bearings, a teletorque coupled thereto for simultaneous actuation thereof adapted for mounting at the trainee's station, Omni range selector means connected to the last mentioned teletorque adapted for selective adjustment thereof by the trainee in selecting a predetermined simulated Omni range bearing angle, a To-From annunciator associated with said Omni range selector, a To-From selection actuator adjacent said Omni range resolver connected to said To-From annunciator for selective actuation thereof by the instructor, said Omni range resolver including a compass rose simulating Omni bearing angles around a simulated Omni range station, adapted to be traversed by said Omni range selection indicating pointer, said pointer having a distinctive color at its indicating end, a relatively wide platform pointer mounted concentrically beneath said Omni range selector indicating pointer for independent adjustment thereto and colored at opposite sides of the longitudinal center thereof substantially from end to end in two additionally distinctive colors representing the yellow and blue or left-right portions of air Omni range beam converging toward an Omni range station from which the Omni range beam emanates, said platform pointer having a central pointer projecting outwardly from the pointer end of the platform pointer on its center line colored in another different distinctive color and adapted to register with said Omni range resolver compass rose, wing pointers projecting outwardly from the opposite sides of the platform pointer perpendicular to the longitudinal center thereof in a plane through the pivotal center of the platform pointer with their extremities adapted to register with the resolver simulator compass rose, said wing pointers being colored a distinctive color and manual adjustment means on said resolver support connected to said platform pointer for selective adjustments thereof by the instructor to accord with the simulated radio compass bearing of the position of the recorder on said supporting surface relative to the simulated Omni range station depicted thereon, during movement and direction of movement of the recorder, as directed by the trainee, toward or away from the simulated Omni station and Omni range, whereby the position of the Omni range selection pointer relative the distinctly colored portion of the platform pointer at opposite sides of the center line thereof denotes the simulated position of the simulated aircraft flight relative to the yellow or blue sectors of the Omni range beam and the position of the Omni range selector pointer in register with the compass rose located in the hemisphere including the ends of the wing pointers and the central pointer of the platform pointer immediately denote the simulated direction of simulated flight toward the simulated Omni range and the position of the Omni range selection pointer in compass rose registration in the hemisphere between the two wing tip pointers not including the central pointer immediately denotes to the instructor the simulated direction of flight away from the simulated Omni range.

References Cited in the file of this patent

UNITED STATES PATENTS

| | | |
|---|---|---|
| 2,321,799 | Cone et al. | June 15, 1943 |
| 2,402,271 | Andrews | June 18, 1946 |
| 2,404,386 | Levine et al. | July 23, 1946 |
| 2,559,039 | Decker | July 3, 1951 |
| 2,560,527 | Dehmel | July 10, 1951 |